Patented Dec. 21, 1937

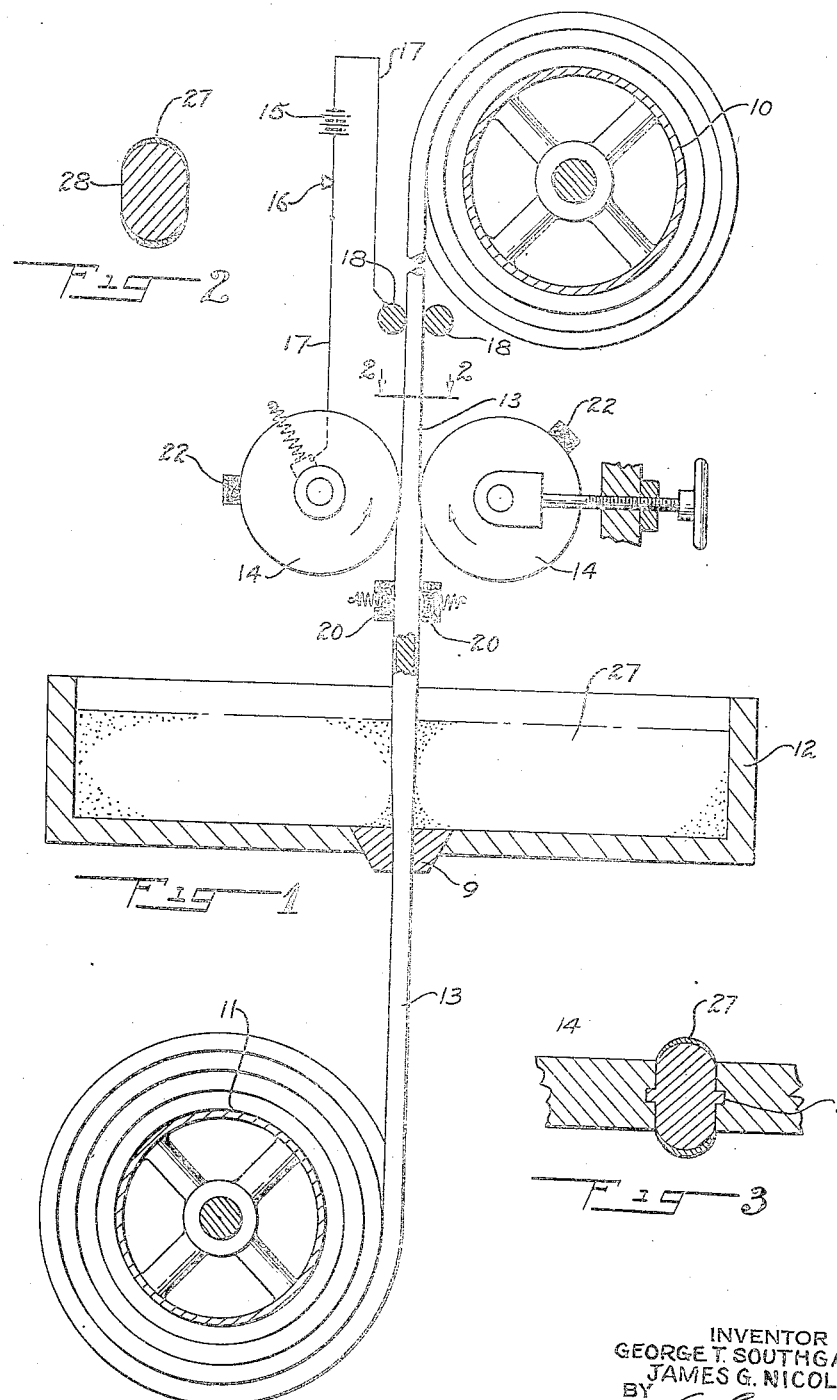

2,102,812

UNITED STATES PATENT OFFICE 2,102,812

METHOD OF AND APPARATUS FOR MAKING WELDING RODS

George T. Southgate, Forest Hills, and James G. Nicolson, Niagara Falls, N. Y., assignors, by mesne assignments, to Union Carbide and Carbon Corporation, a corporation of New York Application August 14, 1934, Serial No. 739,748
Renewed May 7, 1937

15 Claims. (Cl. 29—33)

The present invention relates to welding rods or wires, and more particularly to methods of and means for the continuous coating, shaping and drying of wire to be used as filler metal in fusion welding by the oxyacetylene, electric arc, or other welding processes.

Welding rods or wires have been proposed heretofore which consist of substantially elliptical or dumb-bell shape in transverse section. It has also been proposed to apply an oxide or other coating upon circular welding rods, or upon the rounded portion of a partly circular welding rod.

Welding rods such as described or proposed heretofore suffer from the disadvantage that they do not combine the possibility of efficient electrically conductive contact with a current-carrying member, with the possibility of ready visibility to the operator when welding within grooves. Furthermore, these welding rods do not lend themselves to holding the arc effectively or symmetrically (as in electric welding). The control of the welding puddle and the production of perfect or satisfactory welds are rendered more difficult by their use. Also, as far as applicants are aware, there is no method of nor apparatus for manufacturing such or similar electrodes in an efficient and continuous manner.

An object of this invention is to provide a method and apparatus for producing a welding wire shaped in such a manner as to enable an efficient electrically conductive metal-to-metal contact between a portion of the surface of the wire and an electrically conductive member or element of an automatic or other welding machine.

Another object of this invention is to provide an apparatus adapted for altering the shape of a wire, coating a portion of the surface of the wire, and drying the coated wire, in a continuous succession of operative steps.

These and other objects of the invention are accomplished, in accordance with this invention, by providing a method and automatically means for continuously operating means for producing a welding rod in which two coated and transversely curved longitudinally continuous surface portions are spaced by two bare longitudinally continuous surface portions. The welding rod produced by the present method and apparatus forms the subject matter of copending application Serial No. 100,418, filed September 12, 1936.

The novel and characteristic features of our invention are set forth with particularity in the appended claims. The invention itself, however, both as to its organization and its mode of operation, together with additional objects and advantages thereof, may be better understood from the following description of a specific embodiment thereof, and of the method of its operation, when read with reference to the accompanying drawing in which:

Figure 1 schematically represents an apparatus for simultaneously coating, shaping and drying any desired type of weld wire;

Figure 2 represents a cross-section along line 2—2 of the weld wire shown in Figure 1, and Figure 3 represents a cross-section of a modified type of weld wire.

The apparatus shown in the drawing comprises upper and lower wire reels 10 and 11 respectively, preferably of metal, and intermediate these reels a dipping trough 12 and a pair of cylindrical flattening rolls 14 driven in any conventional manner. The wire 13 is unwound from the lower reel 11, passed upwardly through the gland or stuffing box 9 of dipping or coating tank 12 and is wound upon the upper reel 10 which is also driven by suitable means, such as a belted connection to the driving means (not shown) provided for the flattening rolls 14. Preferably, there is some degree of slippage between the rate of drive of the rolls and that of the upper reel to compensate for the changing periphery of the coil of wire as it piles up on the reel. A source of electric current is provided at 15 which is connected into a circuit including switch 16, conductors 17, roll 14, wire 13, and contact rollers 18. This circuit, when closed by switch 16, causes electric current to flow through the portion of wire 13 which at any given instant is comprised between rolls 14 and contact rollers 18, of a magnitude sufficient to complete the drying before each increment of the wire reaches the upper reel 10. The upper or auxiliary rolls 18 may serve not only for the upper conductive connection but also, through suitable mechanism of familiar type, for guiding the wire into a neat lay upon the reel, thus forming a compact coil thereon. The wire may be left on the upper reel 10 for shipment and use, or the reel may be made collapsible and the coil of wire accumulated thereupon removed and prepared for shipment as by wrapping with paper. A pair of soft pads 20 are arranged above the dipping or coating vat 12 and below the flattening rolls 14, one on each side of the wire 13. These pads are adjusted and disposed to wipe off from the lateral peripheral portions of the wire about to be flattened, the coating liquid which would otherwise become deposited upon the rolls. To supplement these lateral wire-wipers there are provided a pair of roll-wipers 22 pressing against the periphery of the two flattening rolls, in order to remove any coating liquid which might escape the wire-wipers in the lateral zones of the flattening.

The operation of the apparatus for the simultaneous localized coating, flattening and drying of weld wire is as follows:

The apparatus is started by starting the rotation of the rolls 14 in the direction shown by the arrows. A wire, such as wire 13, having been previously wound upon reel 11, is partly unwound from the reel, passed through the gland 9 of the coating tank 12 where it is covered with coating material 27; then it is passed through the pads 20, and is brought into engagement first with the flattening rolls 14, and then with the contact rollers 18. At this moment switch 16 is closed, whereby the portion of the wire between rolls 14 and 18 is heated and dried. The wire 13 is then brought into engagement with rotating reel 10 and wound thereupon.

The process and apparatus described may be used for coating of welding wire with various types of coating material, including oxides, salts, metal powders, fibrous materials, organic substances, mineral or other powders suspended or dissolved in water, alcohol, ethylene dichloride, carbon tetrachloride, and/or any other sufficiently volatile liquid. The coating bath should preferably be made up as a rather viscous slurry, and may contain in solution or suspension, glue, resins, or other cementitious materials which when dried will impart strong bonding property to the coating. The coating and drying may proceed at any desired rapid rate, such as 60 ft. per minute, for example. The operation of the invention may be effected in multiple, i. e. with a number of wires drawn through the same bath and rolls, but taken from or carried to individual supply reels and receiving reels, and provided with electric heating circuits connected in parallel.

The product made in accordance with this invention has certain substantial advantages over welding wire previously made. The flattened shape of the wire lends itself to greater visibility to the operator, especially in welding within deep grooves, and thus assists him in holding the arc (in electric welding), controlling the puddle, and perfecting the quality of the deposit. The bare flat surfaces of the wire are particularly useful for conductive electric connection in feeding the wire through automatic arc-welding machines, and are helpful even in manual welding in giving quick connection by clamping with ordinary pliers.

Figure 2 represents a cross-section of a flattened wire produced by using smooth cylindrical shaping rolls. The coating material is shown at 27 and the flattened contact-providing surfaces at 28. A preferred weld wire of this type is one in which the major axis bears a relation to the minor axis of about 1 to ½.

By using a pair of shaping rolls having a profiled periphery it is possible to obtain a weld wire in which the bare contact-providing surface carries one or two projections or ridges such as shown in Figure 3. This shape of the contact surface has the advantage of providing guiding contact ridges 31 for accurately aligning the wire when passing it through the welding head of an automatic arc-welding machine. Of even greater importance, these ridges serve as improved means of electric contact as the wire passes through an automatic welding head, in that they may be pressed tightly without injury to the coating, and may be operated at high current density.

We claim:

1. In combination, means for coating a wire with a material adapted to form an adhesive coat when dried, means for removing a portion of said coat at substantially diametrically opposite longitudinal portions thereof prior to the drying of the coating material, rotary means for reducing the cross-section of said wire in a direction perpendicular to the portions from which the coating has been removed, and means for rapidly drying the portions of the coating material remaining upon said wire.

2. Apparatus for the continuous coating, shaping and drying of wire to be used as filler metal in welding processes, said apparatus comprising a supply of coiled wire blank, a receptacle containing a viscous coating material adapted to be traversed by the wire to coat said wire, means for removing the coating material along opposite lateral portions of the wire, a pair of rollers adapted to flatten the said lateral portions, and means for drying the coating material remaining on said wire.

3. In combination, means for coating a wire with a material adapted to form an adhesive coat when dried, means for removing a portion of said coat at substantially diametrically opposite longitudinal portions thereof prior to the drying of the coating material, rotary means for reducing the cross-section of said wire in a direction perpendicular to the portions from which the coating has been removed and for producing ridges upon the wire in said portions.

4. Apparatus as defined in claim 2 in which the means for drying the coating material upon the wire include an electrical circuit, whereby the wire is heated to the desired temperature by virtue of its inherent electrical resistance to the flow of current therein.

5. An apparatus adapted for the automatic manufacture of partly coated weld wire, comprising in combination a lower and an upper wire reel, the lower reel being adapted to carry a supply of wire blank and the upper wire reel being adapted to receive the finished product, a receptacle containing a supply of coating material, a pair of flattening rollers adapted to propel said wire through said receptacle to coat said wire, means for removing the coating material from opposite portions of said wire, surface shaping means including said flattening rolls adapted to engage said wire at its bare portions and to transform its cross-section into one having a major and a minor axis, a second pair of rolls, and means cooperative with both pairs of rolls for rapidly drying the coating upon said wire prior to its being wound upon said upper wire reel.

6. Apparatus for the continuous coating and shaping of wire to be used as filler metal in welding processes, which comprises the combination of means for covering the wire with a coating material; means for removing at least a portion of the coating material from diametrically opposite sides of such wire; and means for flattening such wire at the sides from which coating material has been removed.

7. Apparatus for the continuous coating and shaping of wire to be used as a filler metal in welding processes, which comprises the combination of means for covering the wire with a coating material; means for removing a portion of the coating material from the surface of said wire; and means for flattening such uncoated surface.

8. Apparatus for the continuous coating and shaping of wire to be used as a filler metal in welding processes, which comprises the combination of means for covering the wire with a coating material; means for removing a portion of the coating material from the surface of said wire; and means for shaping such uncoated surface so as to provide a more effective contacting and feeding portion thereon.

9. Apparatus as defined in claim 2 in which the flattening rollers are adapted to produce at least one ridge upon one flattened lateral portion of said wire.

10. The process of making a weld wire, which comprises altering the cross-section of said wire to a partly rectangular shape the smallest sides of which are rounded, and covering the rounded sides of said wire with a coating material.

11. The process of making a weld wire which comprises covering a wire with a coating material, removing said material from diametrically opposing sides of said wire; exerting pressure upon said bare sides to substantially flatten said wire, and rapidly drying said coating material upon said wire.

12. Process as defined in claim 11 in which the rapid drying process is effected by the passage of electric current through at least a portion of said wire.

13. A process of making a welding wire having a coating material thereon which comprises applying coating material, dissolved or susupended in a volatile liquid, to successive portions of a bare welding wire in such manner as to leave a bare portion longitudinally of the wire; passing a heating electric current through successive coated portions of the wire to dry the coating material thereon; and conducting said current to said wire through spaced contacts bearing against said bare portion.

14. A process of making a coated welding wire which comprises applying coating material, dissolved or suspended in a volatile liquid, to successive portions of a welding wire; and passing a heating electric current through successive portions of said wire to dry the coating material thereon.

15. A proces of making a coated welding wire which comprises applying coating material, dissolved or suspended in a volatile liquid, to successive portions of a welding wire; and electrically heating such wire to dry the coating material thereon.

GEORGE T. SOUTHGATE.
JAMES G. NICOLSON.